Figure 1:
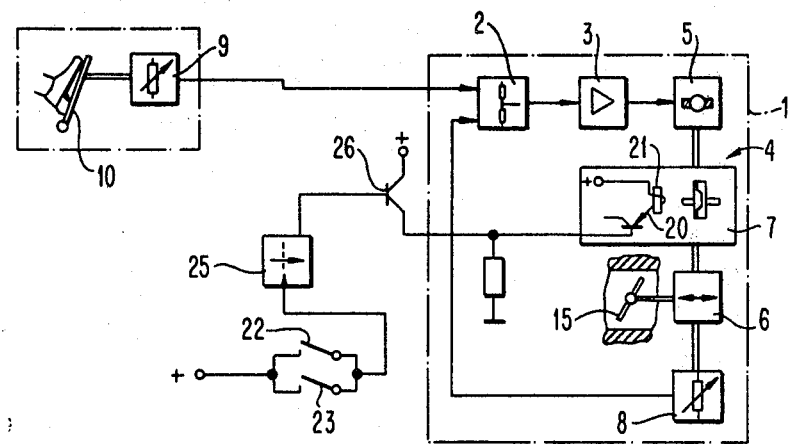

United States Patent [19]

Collonia

[11] 4,419,973

[45] Dec. 13, 1983

[54] DEVICE FOR THE CONTROL OF THE TRAVELING SPEED OF A MOTOR VEHICLE

[75] Inventor: Harald Collonia, Königstein, Fed. Rep. of Germany

[73] Assignee: VDO Adolf Schindling AG, Frankfurt am Main, Fed. Rep. of Germany

[21] Appl. No.: 289,850

[22] Filed: Aug. 4, 1981

Related U.S. Application Data

[62] Division of Ser. No. 86,828, Oct. 22, 1979, Pat. No. 4,313,408, which is a division of Ser. No. 894,371, Apr. 7, 1978, abandoned.

[30] Foreign Application Priority Data

Feb. 9, 1977 [DE] Fed. Rep. of Germany ....... 2754826
Mar. 30, 1977 [DE] Fed. Rep. of Germany ....... 2714113
Dec. 2, 1977 [DE] Fed. Rep. of Germany ....... 2753702
Dec. 2, 1977 [DE] Fed. Rep. of Germany ....... 2753703

[51] Int. Cl.³ ...................... F02D 11/10; F02B 17/00
[52] U.S. Cl. .................................. 123/396; 123/397; 123/399; 123/340; 123/361; 180/271; 180/281
[58] Field of Search .............. 123/397, 396, 399, 340, 123/361; 180/271, 272, 281, 282

[56] References Cited

U.S. PATENT DOCUMENTS

| 3,809,034 | 5/1974 | Durichen | 123/361 |
|---|---|---|---|
| 4,112,885 | 9/1978 | Iwata | 123/361 |
| 4,163,432 | 8/1979 | Hertfelder | 123/361 |
| 4,305,359 | 12/1981 | Mann | 123/361 |

*Primary Examiner*—Ronald B. Cox
*Attorney, Agent, or Firm*—Martin A. Farber

[57] ABSTRACT

A device for the control of the traveling speed of a motor vehicle with a regulating unit actuateable by the vehicle driver, particularly a gas pedal, and means for transmission of the movement of the same to an element, particularly the throttle valve, which influences the fuel-air mixture. An electrical controller is provided, the desired value input of which is applied with the output signal of a first electrical position indicator, the latter being coupled with the regulating unit and the actual value input of which is applied with the output signal of a second electrical position indicator, the latter being coupled with the setting member or positioning actuator of an electrical setting or adjusting device, the actuator standing in connection with the element which influences the air-fuel mixture. Upon actuation of the brake or clutch, a coupling device, between a servomotor of the electrical controller and the actuator, is disconnected for a short time.

10 Claims, 1 Drawing Figure

DEVICE FOR THE CONTROL OF THE TRAVELING SPEED OF A MOTOR VEHICLE

This is a division, of application Ser. No. 086,828 filed Oct. 22, 1979. Ser. No. 86,828, now U.S. Pat. No. 4,313,408, in turn a divisional application of parent application Ser. No. 894,371 filed Apr. 7, 1978, now abandoned.

The invention relates to a device for the control of the traveling speed of a motor vehicle with a regulating unit actuateable by the vehicle driver, particularly a gas pedal, and means for transmission of the movement of the same to an element, particularly the throttle valve, which influences the fuel-air mixture.

With known devices of this type of gas pedal is located in the vehicle space, the gas pedal being connected with the throttle valve in the motor space either by means of a Bowden cable or by means of rods. Particularly with trucks by which the gas pedal and throttle valve generally are arranged with a larger distance from one another, this led to comparatively high displacement or regulating forces on the gas pedal, which can be avoided to a certain extent only by careful laying of the Bowden cable or by a special construction of the rods. Beyond that such type of devices have a construction which is disadvantageous in assembly or installation and maintenance.

The invention cooperates with an electrical controller (1), the desired value input of which is applied with the output signal of a first electrical position encoder or indicator (9), the latter being coupled with the regulating unit (10) and the actual value input of which is applied with the output signal of a second electrical position encoder or indicator (8), the latter being coupled with the setting member or positioning actuator (6) of an electrical setting or adjusting device (4), the actuator (4) standing in connection with the element (15) which influences the air-fuel mixture.

In order to guarantee that the throttle valve does not pivot into a full or open throttle position, or remain in the position, with an adjusting device with a servomotor standing in connection with the positioning actuator carrier via an electrically actuateable coupling device, means are provided which inoperatively switch or disconnect the coupling device (7). Since the servomotor pivots the throttle valve out from its rest position against the force of a spring, by decoupling of the servomotor (5) from the positioning actuator carrier, the throttle valve (15) is pivoted back by the spring into its rest position, whereby the motor falls back to its idling rotational speed.

Upon actuation of the brake of the vehicle or the vehicle clutch, the coupling device (7) between the servomotor (5) and the positioning actuator (6) is switched inoperative, that is the coupling separates the servomotor from the positioning actuator (6), so that the throttle valve (15) unhindered can be pivoted back into its rest position as a result of the resetting or restoring spring which engages thereon. Upon the swinging back of the throttle valve, by this also the positioning actuator i.e. regulating unit (6) and the position encoder or indicator (8) which stands in connection with the latter is moved back into its rest position.

Under circumstances it can occur that, for example with a freezing or icing of the suction or intake system, the throttle valve cannot be pulled back into its rest position from its pivoted position by the spring engaging thereon, so that an undesired abnormal action or behavior of the motor can result. Such a type of abnormal operating condition indeed can occur also with the known devices by which the gas pedal is connected via a Bowden cable or via rods with the throttle valve, however there the possibility exists, to be able to move the throttle valve back again into its rest position by drawing out the gas pedal.

Accordingly by the invention, such type of abnormal action or behavior of the device is stopped in the manner that means (25, 26) are provided which inoperatively switch the coupling device (7) only for a short period of time upon actuation of the brake of the motor vehicle, of the vehicle clutch and/or of another element which produces a resetting or zeroing signal.

By this measure it is achieved if a return movement of the throttle valve does not occur during the short period of time of inoperative switching, that the latter is positively moved back into its rest position by the servomotor subsequently upon the next operative reswitching of the coupling device. As tests have shown, it suffices to switch the coupling device inoperative for approximately 0.2 seconds, that is to separate the connection between the servomotor and the positioning actuator. During this time a tilting back of the throttle valve into its original position is possible without anything more. Of course the time duration during which the coupling device is switched inoperative also can be longer, however the danger exists that particularly with switching operations, disturbing effects results in the control course.

According to one embodiment of the invention a monostable multivibrator (25) is provided which, upon actuation of the vehicle brake, of the vehicle clutch and/or of another element which produces a resetting or zeroing signal, is controlled into its quasistable condition and during this condition, the coupling device (7) is inoperatively switched, i.e. disconnected. The triggering of the monostable multivibrator can take place directly from the motor vehicle brake, the vehicle clutch and/or the element. The relaxation time is sized such that the positive return movement of the throttle valve into its rest position only takes place when the normal decontrol time has expired; the positive return movement in this case thus does not interfere in the normal decontrol operation.

It has now been shown that, particularly during shifting operations by which the gas pedal in a known manner is withdrawn or retracted quickly and subsequently the vehicle clutch is immediately actuated, yet also during braking operations, the controller can only follow such an operation with a time delay so strong such that for a short time an undesired rotational speed overrunning or racing of the motor occurs.

With the above and other objects and advantages in view, the present invention will become more clearly understood in connection with the following detailed description of preferred embodiments, when considered with the accompanying drawings, of which:

FIG. 1 is a block circuit diagram of a device by which the means are provided which temporarily inoperatively switch the coupling device.

The device according to FIG. 1 contains an electrical controller 1, which essentially comprises a comparator 2, an amplifier 3 connected following the latter in series and a setting or adjusting device 4, the latter comprising an electrical servomotor 5, a setting member or positioning actuator 6 (i.e., a regulating unit) and an electromatic coupling or clutch 7 connected therebetween. The controller 1 in addition contains a setting transmitter or position encoder 8 which is connected with the actuator 6 and transmits to one input of the comparator 2 a voltage proportional to the prevailing position of the position encoder 8. On the other input of the comparator 2, which for example is constructed of a series connection of two resistors which are applied at their free ends with the signals to be compared and the ends of which are connected with one another form the comparator output, there lies the position encoder 9, the latter being formed as a variable resistor and coupled with the gas pedal 10 of the motor vehicle. The position encoder 9 delivers a voltage signal which is dependent on the prevailing position of the gas pedal 10. For explanation of the manner of operation of the device, let us start out for example with the gas pedal 10 located in its rest position and the motor rotating with its idling rotational speed. The throttle valve 15 is located in its idling position. If the gas pedal 10 is now pivoted about a certain angle by the driver, the position encoder 9 supplies a higher voltage signal to the comparator 2, the latter thereby triggering or driving the servomotor 5 via the amplifier 3. The motor pivots the throttle valve 15 via the positioning or setting actuator 6 in the sense of an increase in the rotational speed. The position change of the setting actuator 6 results in a change of the output signal of the position encoder or setting transmitter 8, whereby the voltage increases at the other input of the comparator 2. The throttle value 15 is pivoted by a value corresponding to the gas pedal pivoting and the motor has a rotational speed corresponding to the gas pedal pivoting 10.

By the device illustrated in FIG. 1 for explanation of its manner of operation, assume that we start out from the condition that the gas pedal 10 is found in a position outside of its rest position and consequently the motor runs with a rotational speed which lies above the idling rotational speed. The throttle valve 15 is located in a position corresponding to this rotational speed. The excitation coil 21 is applied with current and the coupling 7 is in its coupled position in which it connects the setting actuator 6 with the motor 5.

As soon as the brake or the clutch of the vehicle is actuated, consequently the switch 23 or the switch 22, respectively, is closed, the switch 23 being operatively coordinated to the brake, and the switch 22 being operatively coordinated to the clutch. Then the transistor 20 which lies in the excitation circuit of the coupling 7 is inhibited or blocked. The coupling is actuated in the sense of a separation, since the monostable multivibrator 25 is controlled in its quasi-stable condition and the transistor 26 is controlled in the reverse non-conducting direction. After flipping the monostable multivibrator 25 back, the transistor 26 again becomes conducting and thereby controls the transistor 20 in its conducting condition. The excitation coil 21 is again applied with current and the coupling again connects the setting actuator 6 with the motor 5, which motor provides the positive return movement of the throttle valve 15 into its rest position, in case it first is not flipped back.

While there has been disclosed an embodiment of the invention, it is to be understood that this embodiment is given by example only and not in a limiting sense.

I claim:

1. A device for the control of the traveling speed of a motor vehicle with a regulating unit actuatable by the vehicle driver, and means for transmission of the movement of the same to an element, which influences the air-fuel mixture, comprising a regulating unit, a first electrical position encoder being coupled with said regulating unit, said first position encoder having an output with an output signal, means for influencing the air-fuel mixture of the vehicle, an electrical adjusting device including a positioning actuator, the latter being operatively connected with said influencing means, a second electrical position encoder being coupled with said positioning actuator, said second electrical position encoder having an output with an output signal, means comprising an electrical controller including and for controlling said electrical adjusting device and having a desired value input connected with the output of said first electrical position encoder and applied with the output signal of said first electrical position encoder and having an actual value input connected with the output of said second electrical position encoder and applied with the output signal of said second electrical position encoder, means for generating a resetting signal, there being a vehicle element which is coupled to said generating means for producing said resetting signal, said generating means including a first switch coupled to said vehicle element for closing an electrical circuit upon actuation of said vehicle element, the closing of said electrical circuit producing said resetting signal and, said adjusting device including a coupling means operatively connected to said positioning actuator for operatively connecting and disconnecting said positioning actuator, respectively, in dependency on corresponding respective switching conditions of said coupling means, means for inoperatively switching said coupling means only for a short time upon actuation of said vehicle element of the motor vehicle via said resetting signal, said switching means including a multivibrator means activated by initiation of said resetting signal via said switch said switching means further including a first transistor having a base thereof coupled to an output terminal of said multivibrator means for inoperatively switching said coupling means upon activation of said multivibrator means by said switch via said resetting signal, resulting in the only said short time inoperative switching of said coupling means whenever said vehicle element is initially actuated with a reactivation of said coupling means automatically after said short time expires after activation of said multivibrator means.

2. A device for the control of the traveling speed of a motor vehicle with a regulating unit actuable by the vehicle driver and including a throttle valve comprising:

means comprising a feedback loop responsive to an actuation by the driver of the regulating unit for positioning the throttle valve, said loop including a motorized drive electrically operatively connected to said regulating unit for moving said throttle valve, an encoder means for operatively sensing the position of said throttle valve, and a comparator means for comparing a signal of said encoder means with a signal from said regulating unit;

a circuit for deactivating a connection between said motorized drive and said throttle valve; and means for energizing said circuit, said energizing means including a transistor drive, a monostable multivibrator means providing an output signal coupled to said transistor drive, and a switch means coupled to an element of said vehicle operable by said vehicle driver for activating said multivibrator means, said element of said vehicle being a vehicular control directly activated by said driver, said multivibrator means being responsive to said switch means coupled to said element for being activated out of an original electrical state immediately upon operation of said element for deactivating the connection between said motorized drive and said throttle valve for a short time and limiting the deactivation to said short time and said multivibrator means for returning to said original electrical state by itself upon expiration of said short time after activating of said multivibrator means reestablishing the connection between said motorized drive and said throttle valve, said short time being a fixed time delay of said multivibrator means.

3. The device according to claim 1, wherein said multivibrator means comprises a monostable multivibrator means for being controlled into a quasi-stable condition thereof upon actuation of the vehicle element and for inoperatively switching said coupling means only during said quasi-stable condition, said means for inoperatively switching further comprises a second transistor activated by current from said first transistor, said switching means further comprising an excitation coil means driven by said second transistor for mechanically controlling said coupling means.

4. The device as set forth in claim 3, wherein said first transistor has a base-emitter junction coupled between ground and the output terminal of said multivibrator means.

5. The device as set forth in claim 4, wherein said first transistor has a collector connected to a base of said second transistor, a grounded resistor is connected to said collector, and said coupling means is connected to said excitation coil.

6. The device as set forth in claim 1, wherein said regulating unit is a gas pedal.

7. The device as set forth in claim 1, wherein said means for influencing the air-fuel mixture is a throttle valve.

8. The device as set forth in claim 1, wherein said vehicle element is a brake.

9. The device as set forth in claim 1, wherein said vehicle element is a clutch.

10. The device as set forth in claim 21, and further there being a vehicle clutch, wherein said generating means further includes a second switch coupled to said clutch, the actuation of either of said first switch coupled to said brake or said second switch coupled to said clutch closes the said electrical circuit and produces said resetting signal.

* * * * *

UNITED STATES PATENT AND TRADEMARK OFFICE
CERTIFICATE OF CORRECTION

PATENT NO. : 4,419,973
DATED : December 13, 1983
INVENTOR(S) : Harald Collonia

It is certified that error appears in the above-identified patent and that said Letters Patent are hereby corrected as shown below:

Column 6, (Claim 10) Line 25 "21" should read --1--

Signed and Sealed this

Tenth Day of April 1984

[SEAL]

Attest:

GERALD J. MOSSINGHOFF

Attesting Officer    Commissioner of Patents and Trademarks